A. C. AUSTIN.
FLEXIBLE COUPLING FOR CONDUITS.
APPLICATION FILED FEB. 25, 1916.
1,290,869.
Patented Jan. 14, 1919.
2 SHEETS—SHEET 1.
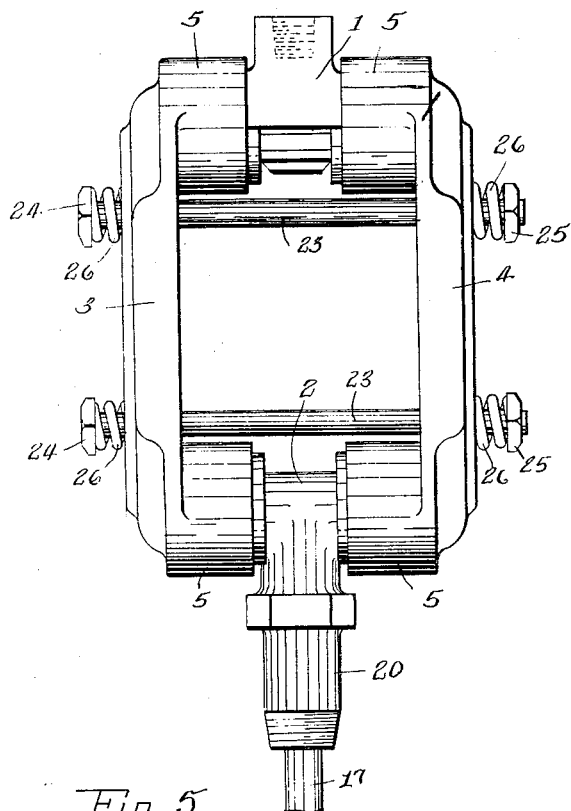
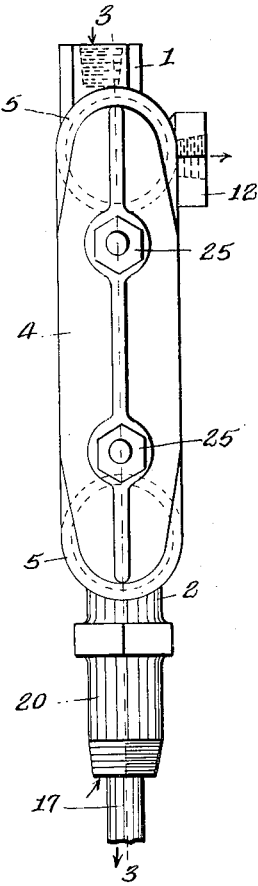
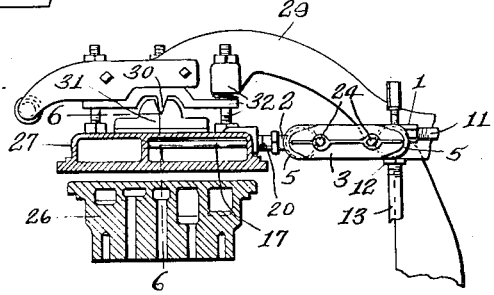
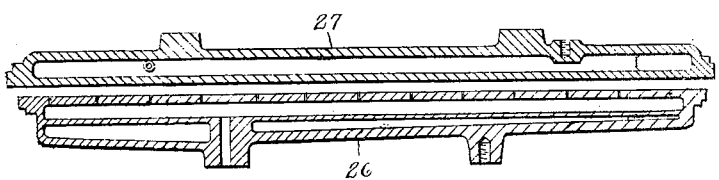
INVENTOR
Allen Clymer Austin
BY
Parsons & Bodell
ATTORNEYS A. C. AUSTIN.
FLEXIBLE COUPLING FOR CONDUITS.
APPLICATION FILED FEB. 25, 1916.
1,290,869.
Patented Jan. 14, 1919.
2 SHEETS—SHEET 2.
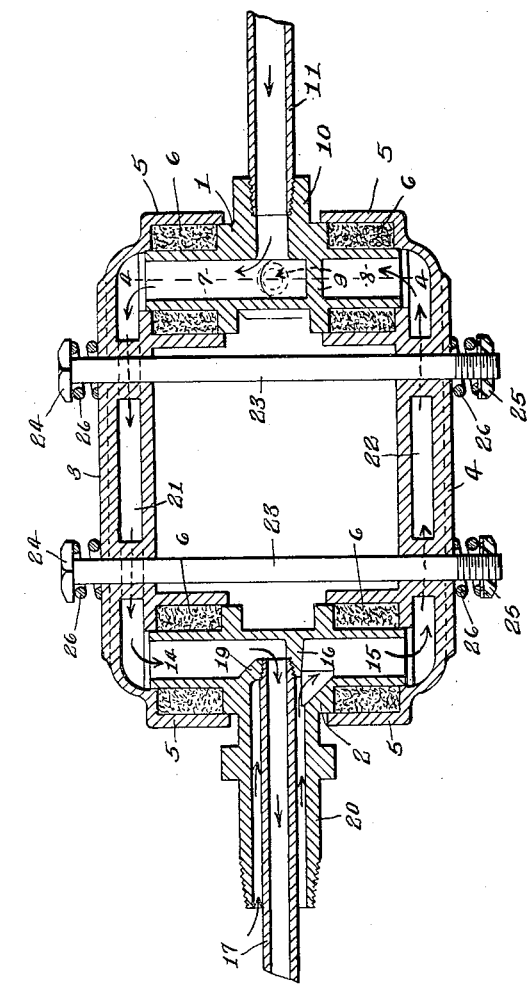
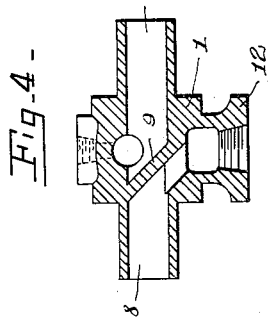
INVENTOR
Allen Clymer Austin
BY
Parsons+Bodell,
ATTORNEYS

UNITED STATES PATENT OFFICE.

ALLEN CLYMER AUSTIN, OF SYRACUSE, NEW YORK.

FLEXIBLE COUPLING FOR CONDUITS.

1,290,869.        Specification of Letters Patent.        Patented Jan. 14, 1919.

Original application filed October 5, 1915, Serial No. 54,149. Divided and this application filed February 25, 1916. Serial No. 80,401.

*To all whom it may concern:*

Be it known that I, ALLEN CLYMER AUSTIN, a citizen of the United States, and a resident of Syracuse, in the county of Onondaga and State of New York, have invented a certain new and useful Fl xible Coupling for Conduits, of which the following is a specification.

This invention has for its object a particularly simple and efficient flexible coupling for conduits, as steam pipes, which is particularly simple in construction and highly efficient and durable in use; and it consists in the combinations and constructions hereinafter set forth and claimed.

In describing this invention, reference is had to the accompanying drawings in which like characters designate corresponding parts in all the views.

Figure 1 is a plan view of a preferable form of this coupling.

Fig. 2 is a side elevation of parts seen in Fig. 1.

Fig. 3 is a section on line 3—3, Fig. 2.

Fig. 4 is a section on line 4—4, Fig. 3.

Fig. 5 is a side elevation, partly in section, of a pressing or ironing machine, illustrating one use of this coupling.

Fig. 6 is a sectional view on line 6—6, Fig. 5.

This coupling comprises generally, end pieces, and lengthwise side pieces articulated or hinged to the end pieces, the side pieces having passages for conveying a fluid as steam, in opposite directions, and the end pieces each having separated passages communicating with like passages of the side pieces, and means for connection with feed and return pipe sections which communicate respectively with the passages of said end pieces. The coupling also is provided with packing in the joints between the side and end pieces and means for holding the parts of the coupling in assembled relation including spring means for automatically compensating for expansion and contraction of the packing so that the coupling, especially the joints thereof, are non-leakable at all times.

1 and 2 designate the end pieces or unions respectively; 3; 4 the side pieces which are formed with passages communicating with the passages of the side pieces, the side pieces having bearings or hubs 5 at their ends rotatably mounted on the ends of the unions 1, 2. 6 are packing rings located within the hubs and interposed between said hubs and the unions 1, 2. The hubs are arranged to move axially during expansion and contraction of the packing or other parts. The coupling here illustrated is formed with passages by means of which the steam or other fluid is conveyed in opposite directions, and the end pieces or unions 1, 2 are formed with inlet and outlet passages which open through opposite ends thereof, and the side pieces 3, 4 are formed with lengthwise passages, one of which conveys the steam or other fluid from the end piece or union 1 to the end piece or union 2 and the other of which conveys the return steam and water from the union 2 to the union 1.

The end piece or union 1 is formed with inl t and outlet or feed and return passages 7, 8 which open through opposite ends thereof and which are separated by an inclined partition 9, the passage 7 being in communication with a hollow radial nipple 10 by means of which connection is made with a feed pipe section 11 and the passage 8 being in communication with the internally threaded nipple 12 by means of which communication is made with an outlet pipe section 13, Fig. 5.

The end piece or union 2 is formed with inlet and outlet passages 14, 15, that is, feed and return passages opening through opposite ends thereof and separated by a partition 16, the passage 14 being in communication with the passage 7 of the end piece 1. The passage 14 is connected to a feed pipe section 17 threading into an internal radial nipple 19. The passage 15 communicates with an elongated radial nipple 20 or return pipe section inclosing and arranged concentric with the pipe 17. The side pieces 3, 4 are provided with passages 21 and 22 respectively which open into the hubs or bearings 5 at their ends, so as to communicate with the passages 7, 14 and 8, 15 of the end pieces or unions; the passage 21 communicating at one end with the passage 7 of the end piece or union 1 and at its other end with the passage 14 of the end piece or union 2, and the passage 22 of the side piece 4 connecting the passages 8 and 15 of the end pieces or unions 1 and 2 respectively.

The means for holding the parts in assembled relation, in this embodiment of my invention, includes fastening members 23 extending transversely through the side pieces 3, 4 and springs associated with the fastening members and acting in endwise directions thereon, that is, in lateral directions relatively to the coupling. The fastening members, as here shown, preferably extend between the end pieces or unions near said end pieces or unions and have shoulders 24, 25 near their ends; and the springs 26 are coiled springs and are located between the shoulders 24, 25 and the side pieces, and act to compensate for expansion and contraction of the parts of the coupling especially the packing rings 6, and to hold the parts snugly together so that leakage at all times is prevented.

As here shown, these fastening members 23 are bolts and the shoulders 24, 25 are respectively the heads, and the nuts on the bolts.

In Figs. 5 and 6 I have illustrated one adaptation of my invention in which it is shown as applied to a pressing or ironing machine including a lower pressing bed 26 and an upper movable head, or buck 27 through which the steam is to be supplied and circulated. As the head 27 is carried by a movable support as a lever 29, my flexible coupling is arranged in position to connect the interior of the movable head 27 to the steam system, and to move as required by the various movements of the buck 27. Furthermore, the coupling being constructed to convey the steam or other fluid in opposite directions, permits the feed and return pipes to be grouped together. In machines of this type these pipes have been more or less widely distributed so that the operator is hampered in his work by being constantly on guard against being burned by coming in contact with the hot pipes. By my coupling the pipes are grouped together so that the operator does not work in constant fear of being burned when arranging the garment or other article to be ironed. Furthermore, in machines of this type the hot water and steam leaks and sprays out of the joints of the couplings now used onto the operator and onto the garment or other article. By my coupling owing to the provision made for automatically compensating for wear and expansion and contraction of the packing, the joints are non-leakable at all times.

The buck or head 27 in addition to the movement of the lever 29 also has certain rocking movement about longitudinal and crosswise axes permitted by the knife edge and separable bearings 30, 31 and the spring suspension at 32 of the head 27 from its support, these rocking movements being due to unevenness in the thickness of the garment or other article. For a full description of the use of my flexible coupling, reference is had to my pending application, Sr. No. 54,149 filed October 5, 1915 of which this is a division.

In operation, the steam passes through the coupling from feed pipe section 11, nipple 10 to the passage 7 of the union 1, passage 21 of the side piece 3, outlet passage 14 of the union 2, feed pipe section 17 to the interior of the buck 27, and the steam and condensation returns from the buck 27 through nipple or return pipe section 20, return passage 15 of the union 2, passage 22 of the side piece 4, return passage 8 of the union 1 and through the return pipe 13. During expansion and contraction the springs 26 compress and expand thus holding the working parts in snug engagement.

What I claim is:

1. A flexible coupling for conduits comprising side pieces having passages therethrough for conducting fluid in opposite directions, and end pieces each having passages communicating with the passages of the side pieces, and means for connection with feed and return pipe sections communicating respectively with the passages of said end pieces, the side pieces being pivoted to the end pieces, substantially as and for the purpose described.

2. A flexible coupling for conduits comprising side pieces having passages therethrough for conducting fluid in opposite directions, end pieces each having passages communicating with the passages of the side pieces and means for connection with feed and return pipe sections communicating respectively with the passages of said end pieces, the side pieces being pivoted to the end pieces, packing inserted in the joints between the side pieces and the end pieces, and means for yieldingly holding said pieces in assembled relation whereby the expansion and contraction of the packing is automatically compensated for, substantially as and for the purpose specified.

3. A flexible coupling for conduits comprising side pieces having passages therethrough for conducting fluid in opposite directions, end pieces each having passages communicating with the passages of the side pieces and means for connection with feed and return pipe sections communicating respectively with the passages of said end pieces, the pieces being pivoted to the end pieces, fastening means extending transversely through the coupling and spring means associated with the fastening means and exerting a pressure in a lateral direction in order to compensate for the contraction and expansion of the packing, substantially as and for the purpose set forth.

4. The combination of a fluid heated movable head, a movable support carrying said head, feed and return conduits connected to the head and comprising sections and a flexible coupling connecting the sections, the feed and return conduits being grouped together, and the flexible coupling including passages extending in opposite directions therethrough, substantially as and for the purpose described.

5. A flexible coupling for conduits comprising unions having separated inlet and outlet passages therein, and means for connecting the passages with conduits, and side pieces articulated to the unions and having passages communicating with the passages of the unions, substantially as and for the purpose specified.

6. A flexible coupling for conduits comprising unions having separated non-communicating passages therein, and means for connecting the passages with conduits, side pieces connecting the unions and having passages communicating with the like passages of the unions, and fastening members extending transversely through the side pieces near the unions, substantially as and for the purpose set forth.

7. A flexible coupling for conduits comprising unions and side pieces connecting the unions, each union being formed with separated feed and return passages opening through opposite ends thereof and with radially extending nipples for connection to conduits communicating respectively with said passages, the side pieces having bearings mounted on the ends of the unions and each being formed with a passage communicating with the passages opening through like ends of the unions, substantially as and for the purpose described.

8. The combination of a fluid heated pressing head, a pivoted lever supporting and carrying the head, feed and return conduits connected to the head, the conduits being grouped together and including sections, and a flexible coupling connecting the sections, the coupling having feed and return passages grouped together for connection with the feed and return conduits, substantially as and for the purpose specified.

9. The combination of a fluid heated pressing head, a pivoted lever supporting and carrying the head, feed and return conduits connected to the head, the conduits being grouped together and including sections, and a flexible coupling connecting the sections, the coupling having feed and return passages grouped together for connection with the feed and return conduits, said coupling being formed with substantially parallel hinged joints, one of which is arranged in axial alinement with the pivot of the support for the head, substantially as and for the purpose set forth.

In testimony whereof, I have hereunto signed my name, at Syracuse, in the county of Onondaga, and State of New York, this 20th day of December, 1915.

ALLEN CLYMER AUSTIN.